(No Model.) 2 Sheets—Sheet 1.
A. S. KISSELL.
ELECTRO AUTOMATIC VALVE.
No. 343,642. Patented June 15, 1886.
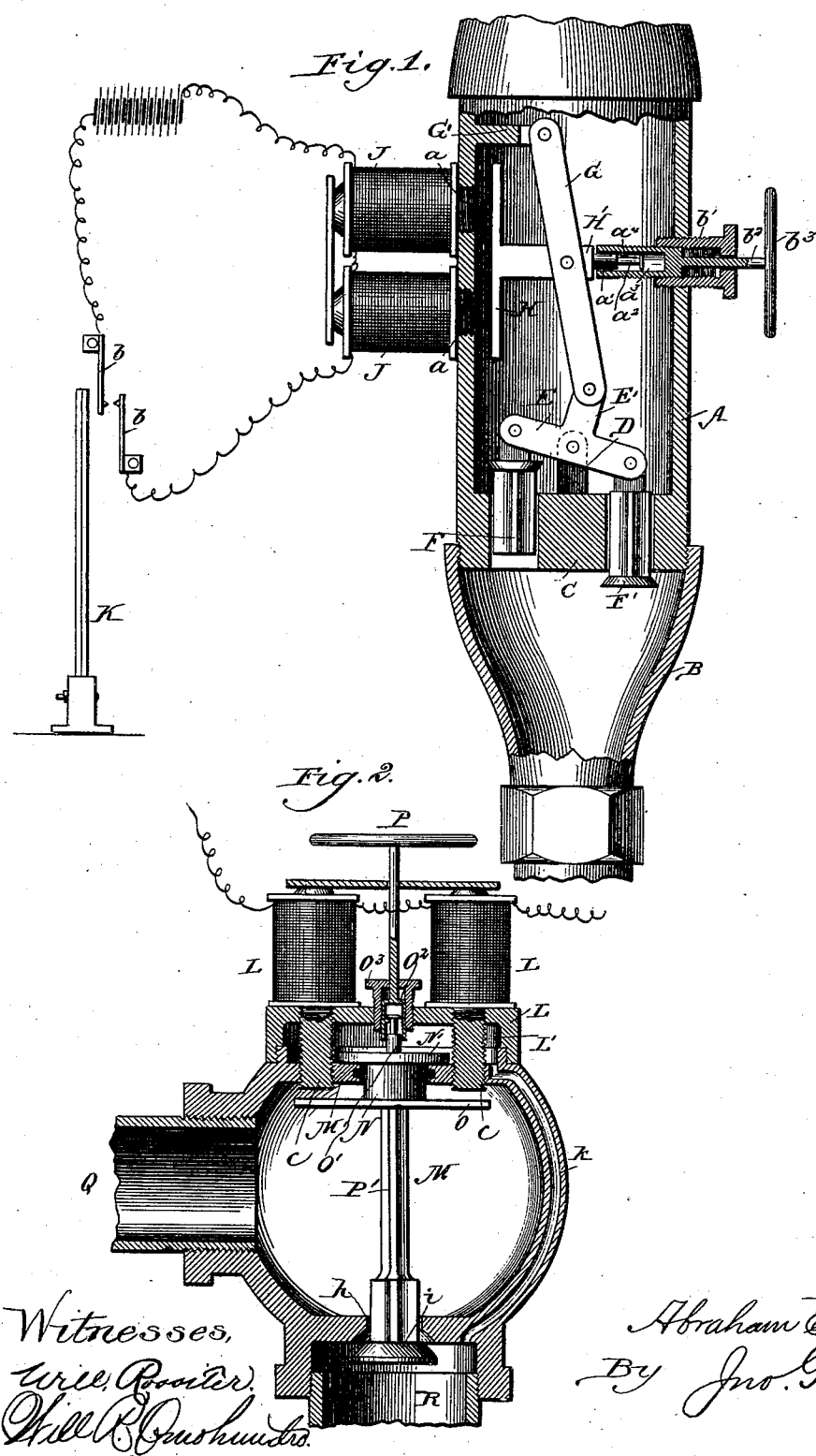
Witnesses,
Will. Rooter
Will. R. ...
Inventor:
Abraham S. Kissell
By Jno. G. Elliott
Atty.
N. PETERS, Photo-Lithographer, Washington, D. C.

(No Model.)  2 Sheets—Sheet 2.
A. S. KISSELL.
ELECTRO AUTOMATIC VALVE.
No. 343,642. Patented June 15, 1886.
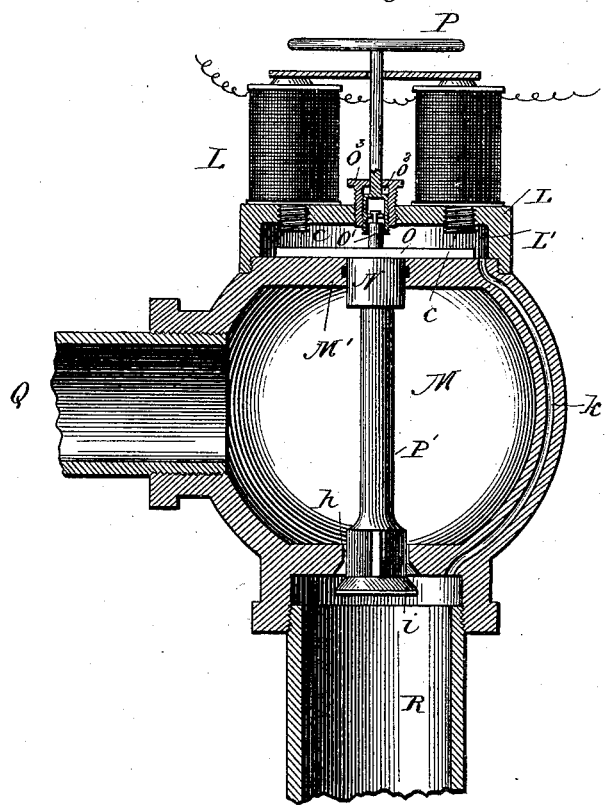

UNITED STATES PATENT OFFICE.

ABRAHAM S. KISSELL, OF CHICAGO, ILLINOIS.

ELECTRO-AUTOMATIC VALVE.

SPECIFICATION forming part of Letters Patent No. 343,642, dated June 15, 1886.

Application filed February 26, 1886. Serial No. 193,283. (No model.)

*To all whom it may concern:*

Be it known that I, ABRAHAM S. KISSELL, a citizen of the United States, residing in Chicago, county of Cook, and State of Illinois, have invented certain new and useful Improvements in Electro-Automatic Valves, of which the following is a specification.

This invention relates to improvements in automatic valves for regulating the supply of steam, air, water, or gas to hydraulic, gas, or air engines or to any device to which a regulated supply of these elements is desired to be fed, but has more particular reference to the automatic valves used in connection with heating apparatus for regulating the temperature of rooms and buildings, and especially steam-heating apparatus in connection with which I shall describe my invention.

The prime object of this invention is to have a valve automatically operated to regulate the supply of steam to steam-coils, radiators, &c., and controlled by the action of a thermostat, whereby an even and uniform temperature of the apartment in which such coil or radiator is located may be insured.

Another object is to have such a valve automatically operated to cut off the supply of steam by means of a thermostat whenever the temperature of the apartment in which the steam-radiator and thermostat are located exceeds the prescribed limits, and also to provide an electrical connection between the thermostat and the valve, whereby the action of the thermostat will close the circuit thereof and produce a corresponding action and closing of the valve through the medium of the armature forming part of such electric connection.

Further objects are to produce a valve automatically operated to cut off the supply of steam to the coil or radiator through the medium of the armature operated by the magnet of an electrical circuit, to provide a valve automatically operated to cut off and re-establish communication between the steam-supply pipe and the radiator, acted upon alternately by the armature of a magnet forming a part of an electric circuit and the action of live steam from the supply-pipe, whereby the supply of steam admitted to the radiator may be regulated and controlled at will.

Other objects are to have such a valve so constructed that the action of a thermostat located at any point in a room or apartment, through the medium of an electric connection between such thermostat and valve, will automatically close the valve when the temperature of the apartment exceeds the prescribed limits, but which valve will be automatically opened by the action of the supply of live steam immediately the temperature of the room or apartment becomes less than the prescribed limits, whereby a uniform and unvarying temperature in any apartment may be insured; to have such a valve so constructed that approximately a steam-balance is maintained between two inlet-ports thereof and in the line of travel of the steam; to have in such an automatic valve two check-valves actuated simultaneously to open and close the steam passage or ports leading from the supply-pipe, on one of which check-valves the steam-pressure will be slightly greater, though acting in the same direction on both, whereby when not controlled otherwise the action of the steam will serve to automatically and simultaneously open both the check-valves, and, finally, to provide certain details of construction hereinafter described, and illustrated in the accompanying drawings, in which—

Figure 1 represents a central vertical section through a valve embodying my invention, showing the electrical connection between the thermostat and the valve; Fig. 2, a similar view of a modification of my invention, showing the same applied to an angle-valve; Fig. 3, a similar view of a second modification of my invention, showing the armature located in the auxiliary steam chamber.

Similar letters of reference indicate like parts in the several figures of the drawings.

Referring by letter to the accompanying drawings, A indicates a hollow shell or casting, preferably composed of brass, as being a non-conducting material, and having screwed or otherwise secured to each end thereof reducers B B, for forming a connection between this shell and the ordinary steam-supply pipes, between which, owing to the functions of the several parts, there is generally a difference in diameter. However, the employment of these reducers is optional, as having no bearing whatever upon the operation of my device, but are simply employed as mechanical expedients for the purpose before mentioned.

Across the lower end of the shell A is a thick partition or diaphragm, C, screwed into, cast with, or otherwise rigidily united with the said shell A, from the upper surface of which, and about centrally thereof, projects a lug or short arm, D, forming the fulcrum or pivot for a lever, E, which is of the first class, and which has pivotally secured to the ends thereof, respectively, and depending therefrom, check-valves F F', which work through suitable holes or perforations provided in the head or diaphragm C. These valves are of the ordinary construction, and are what are generally termed "wing-valves;" but they have their seats on opposite faces of the diaphragm C, the one F on the upper face and the one F' on the lower face thereof, for the double purpose of simultaneously closing the openings in the diaphragm C, when operated by the lever E, and for forming means for automatically opening the said valves when relieved from pressure by the action of the inrushing steam. This is readily accomplished by forming the valve F of a slightly greater diameter than the valve F', in order that the pressure of the steam in passing through may be exerted on a greater area in the valve F than in the valve F'—that is, just sufficient to overcome the steam-balance between these two valves, which a few ounces excess of pressure will accomplish; and although the movement of the valve F' would be directly against the steam-pressure, at the same time the balance of power in the valve F would readily overcome the resistance and simultaneously open both of the valves. An equally important point in providing these two valves, working against and simultaneously with each other and so near to a steam-balance, is the fact that by such an arrangement the power required to close the valves is reduced to the minimum, and a battery of small power may be employed in connection with the means, hereinafter described, for opening and closing these valves, and which would proportionately reduce the cost of supplying such an attachment. This feature of my automatic valve I consider of the utmost importance, and one very essential to the perfect operation of such a device, and a point I believe to be entirely new in the construction of steam-valves, and therefore am entitled to cover, broadly, in the claims.

Projecting upwardly from the lever E, at about the center of length thereof, is another arm, E', to which is pivotally connected another lever, G, which is pivoted in turn at the opposite end thereof to a stud or projection, G', cast with or otherwise rigidly secured to the shell A and projecting inwardly to, or nearly to, the center thereof. To this lever G, about the center of length thereof and between the two pivots just described, is also pivotally secured a horizontal arm, H', of an armature, H, from the free end of which arm projects a short pintle or shaft, $a'$, around the end of which pintle is formed an annular groove, $a^2$, of a width substantially corresponding to the movement or stroke of the armature. This grooved pintle projects into the end of a hollow sleeve, $a^3$, and guides the armature in its reciprocations, and in order to permit a rotation of the sleeve independent of the said pintle, but at the same time to provide a connection between the said pintle and sleeve whereby a sufficient endwise or axial movement of the said sleeve shall produce a corresponding movement of the armature, I have provided a small pin, $a^4$, rigidly secured to the said sleeve and projecting and working in the groove $a^2$ on the said pintle.

In addition to the employment of the devices just described as a guide for the reciprocations of the armature, they are also designed to form part of a device about to be described by which the armature may be rigidly held either in or out of contact with the magnet, and by which the valves may consequently be rigidly held open or closed. To further this end, I provide a screw-thread on the outer surface and end of the sleeve projecting and working in a suitable screw-threaded recess formed in a cap or stuffing-box, $b'$, screwed into and projecting through the wall of the shell A. This stuffing-box may be of the usual form, and preferably have on its outer face what is ordinarily denominated as a "beveled" or "inclined" screw-threaded surface, which, when screwed tightly into the wall of the shell, will form a steam-tight joint therebetween. Projecting through the center or head of this cap or stuffing-box, and rigidly connected with the end of the sleeve $a^3$, or, if desired, cast therewith, is a short rod, $b^2$, to the free end of which is secured, in any well-known and convenient manner, a small hand-wheel, $b^3$, for the purpose of producing a rotation of the said sleeve, which, by reason of the screw thread connection between the said sleeve and the stuffing-box $b'$, will cause the sleeve to travel toward and away from the armature. The normal position of the sleeve is shown in Fig. 1, which permits the forward movement of the armature when actuated by the magnet, as will hereinafter be described; but should it be desired to maintain this armature against the magnet after the electric circuit through the magnet is broken, whereby the valves may be held rigidly closed against the action of the steam, it is only necessary to operate this hand-wheel and force the sleeve inwardly until the pin thereon comes into engagement with the side wall of the groove $a^2$ on the end of the pintle, and by reversing the operation the valve may be held as rigidly open.

It is obvious that if at any time the automatic operation of this valve should be interfered with, either by reason of injury to the thermostat, battery, magnet, or wires connecting the same, the said valve may be readily converted into an ordinary hand-valve, and the temperature of the room or apartment in which it is located regulated in the usual manner.

Screwed through the side walls of the shell A, and projecting slightly into the interior of the shell, directly in front of the armature H, are the poles $a$ $a'$ of a two pole magnet, J, forming part of an electric circuit, which circuit is provided with a battery of suitable strength, and has spring contact-points $b$ $b$ between the battery and one hole of the magnet, for the purpose of making and breaking the electric circuit. These contact-points are located at any desired point within a room or apartment, and preferably at or near the point wherein the temperature of the room is desired to be most uniform, or rather to attain the highest degree, at which point is also located a thermostat, K, (preferably composed of strips of brass and rubber rigidly united together,) for the purpose of utilizing the unequal expansion of these substances to bring the contact-points together and close the electric circuit. This thermostat, as just described, may be composed of two strips of metals or substances supported at only one end thereof—such, for instance, as brass and rubber or gutta-percha, or brass and steel, or any other two metals or substances which have an unequal degree of expansion when submitted to the action of heat—and are firmly united together in order that the excess of expansion of one of the metals may cause the strips to warp or bend to one side of the center; and it is the warp or bending of these strips that I design to employ for opening and closing the electric circuit by pressing against and bringing the contact-points together. The thermostat may of course be regulated so as to close the circuit when the temperature of the room has reached any desired point, and may be readily altered at will. I may here add that although the thermostat herein shown and described is composed of these strips of metal I do not limit myself to this particular construction, for a mercurial thermostat may be employed with equally advantageous results.

The operation of the valve is as follows: When the temperature of the room has reached the limit to which the thermostat is set, the contact-points will be brought together, and the electric circuit closed, whereupon the magnet will instantaneously draw into contact therewith the armature H, which, being pivoted to the lever G, carries forward the free end of the said lever pivotally connected with the lever E, to which the check-valves are secured, which lever is in turn operated to close or seat the check-valves F F', and thereby cut off the supply of steam. So long as the temperature of the room remains above the prescribed limit just so long will the electric circuit be closed and the armature H held in contact with the magnet thereof, and the check-valves for regulating the admission of steam to the radiator be closed and the steam prevented from entering therein; but as soon as the temperature of the room falls below the prescribed limit by reason of the cutting off of the steam the thermostat will release the contact-points, the electric circuit will be broken, and the armature free to return to its normal position, away from contact with the magnet, and as soon as this takes place the action of the live steam, exerting an excess of pressure on the check-valve F, causes the said valve, and also the valve F', to be unseated, and the armature, by reason of the lever-connections between the said valve and armature, withdrawn from contact with the magnet. With the unseating of the check-valves communication between the steam-supply pipe and the steam-coil is re-established, and the steam is free to pass by the said valves and through the shell to the steam-coil or radiator.

The shell carrying the automatic valve is designed to be located at some convenient point, and preferably just forward of the connection between the radiator and the steam-supply pipe, and as its operation is entirely automatic it may be located beneath the floor and out of sight, or, if desired, may be placed in a position more easy of access. It is also preferable to have this shell stand in a vertical position to facilitate the passage therethrough of the condensation from the radiator, which otherwise might become lodged therein and clog the action of the valve, or might become frozen up over night or at a time when the steam is not turned on.

By the employment of my invention it is obvious that the temperature of a room may be automatically regulated and controlled, so as to be held at all times at a nearly uniform temperature, and with a very slight variation as to the number of degrees, for by the construction and operation of the valve it is impossible to change the temperature of the room more than a degree or two without effecting the opening or closing of the valve.

The numerous objections to steam-heating as at present conducted may be readily overcome, and a safe and healthful uniformity of temperature be promoted in any room, no matter where situated nor what the form or location of the radiator may be, so long as sufficient steam is supplied thereto to raise the temperature of the room to the desired degree. Also, by the employment of my invention the necessity for constantly opening and closing valves to regulate the temperature, and the opening of windows and doors to lower the temperature when carried beyond the desired height, even though the valves are closed, may be entirely avoided, and the liability of the occupants of the apartment to the catching of colds by being subjected to the sudden drafts of cold air in the over-heated room lessened.

I do not limit myself to the particular kind of electricity employed for charging the magnet, for the action of all of them would in the main be the same; nor do I limit myself to the particular construction, number, or arrangement of levers herein shown and described, forming a connection between the armature and the check-valves, for any form, number, or arrangement of levers which would produce the same result I consider as within the scope of my invention, and therefore do not deem it necessary to illustrate any of the various forms of connection which might be made.

The broad idea of my invention consists in automatically opening and closing steam-valves by the combined action of electricity and steam, the pressure of the latter being nearly equalized on each side of the valve, the said valves being operated by and attached either directly or indirectly to the armature of a magnet forming a part of an electric circuit, the current of which is made and broken by the action of a thermostat, the power of said current being utilized to overcome the excess of steam-pressure on one side of the valve; and as an instance of the broad differences in construction which may exist in the connections between the armature and the valve, and the various uses to which the principle of my invention may be put, I have shown in Fig. 2 the necessary devices for the carrying out of the principle of my invention attached to an ordinary angle-valve, which is generally a globe-valve or single-seat valve operated by hand. In this instance the two poles of the magnet are placed on the squared upper surface of a cap or covering, L, screwed or otherwise rigidly secured to the top of the globe M, the under side of which cap is recessed to form a chamber, L', between which chamber and the main chamber in the angle globe-valve is a diaphragm or partition, M', perforated about the center thereof, through which works a short piston, N, cast with or otherwise rigidly secured to an armature, O, suspended within the main chamber of the globe M by means of a nut or washer, N', rigidly secured to the head of the piston N, and having a greater diameter than the perforation in the diaphragm M', through which the piston works. Projecting upwardly from the face of this washer or from the head of the piston and through the washer is a grooved pintle, O', a sleeve, O², stuffing-box O³, rod and hand-wheel P, all of which latter parts have identically the same functions, operation, and effect as the similar parts hereinbefore described in connection with the armature of the preferred construction. In this construction the two poles of the magnet are connected with the battery in the same manner as in the previously-described construction, and have the contact-points for making and breaking the electric circuit actuated by the thermostat, as before described, and also have poles $c$ $c$, respectively screwed through the cap L and diaphragm M' of the globe and projecting slightly into the main chamber of the globe. Suspended below these poles in the manner previously described, and in such position as to come in contact therewith, when elevated, is the armature O, having cast therewith the short piston N, and depending from the under face of which armature is a rod, P', which has the lower end thereof grooved to form wings, between which are passages, and which end works through a suitable opening, $h$, formed in the bottom of the globe M, and has provided thereon an ordinary valve, $i$, adapted to seat upon and close the opening $h$ when the rod is elevated. Connecting with the globe are the pipes Q and R, the former leading to the radiator and the latter to the steam-supply, and leading from the chamber in the bottom of the globe M, with which the latter pipe connects, is a passage or duct, $k$, extending around and up through the walls of the globe M and leading into the chamber L'. In this valve when the circuit is closed the armature is drawn in contact with the magnet, the pintle O' and the hole $h$ serving as a guide for the rod P' in its upward travel. The valve $i$ will seat over and effectually close the opening $h$, leading into the globe, and thus cut off the supply of steam to the radiator. Immediately, however, the circuit is open the armature is free to fall to its normal position, and thereby unseat the valve $i$; but as the pressure of the steam would be all on this valve, and be likely to even overcome the gravity of the armature and its connections, I have provided the steam-duct $k$, to insure the instantaneous unseating of the valve $i$ by producing a slight excess over a steam-balance between the ends of the said valve $i$ and the piston N in favor of the piston, which, thus relieving the armature and its connections of the steam-pressure, acts in conjunction with its gravity to fall to its normal position and unseat the valve. Hence it will be seen that, although the details of mechanical construction of these two forms is so very different, still the broad idea or principle remains the same in both cases, and this principle, as previously stated, I claim as broadly new, and should therefore not be limited to the particular form or construction of the mechanical means employed for producing the desired result.

While I have shown and described my electro-automatic valve in connection with its use in apparatus for steam-heating, it is obvious that equally advantageous results would arise from the use of the valve in connection with hot air, gas, hot or cold water, or any other medium, and in connection with any class of device with which such a device is adapted for use. I may also add that the armature in the modified construction may take the place of the disk for preventing the downstroke, or, rather, limiting the fall of the valve and armature, in which case the said armature would be located within the steam-chamber above the piston, and the poles of the magnet correspondingly shortened—that is to say, they need not project through the diaphragm across the top of the globe, but only through the cap, and this construction will be found of especial utility in cases where the battery is weak, for it will obviously shorten the poles almost to their normal length. In conclusion, I may add that the wiring between the thermostat, battery, and magnet may be done in any known or convenient manner, and that the battery from which the power is derived may be located at any suitable point.

Having described my invention, what I claim, and desire to secure by Letters Patent, is—

1. A valve provided with operating opposing faces differing in area and normally seated or unseated under equalized opposing pressures of steam, in combination with an electro-magnet and circuit-controlling devices for overcoming the pressure on the larger face of said valve, substantially as described.

2. In an electro-automatic valve, a diaphragm, perforations in said diaphragm, valves working through said perforations, one of which has a slightly greater area exposed to the action of the steam, and a pivoted lever-connection between the ends of the valves opposite those exposed to the steam-pressure, in combination with an armature for automatically actuating said valves, and a connection between said valves and the armature, substantially as described.

3. The shell, the steam-pipe, a diaphragm in said shell, and perforations in said diaphragm, in combination with valves working through said perforations, seating upon opposite sides of the diaphragm, and one of them having a slightly greater area than the other exposed to the action of the steam, and a pivoted lever-connection between said ends of the valve opposite to the end exposed to the pressure, whereby the pressure of steam in opening the valves may be overcome by the expenditure of a small amount of force, substantially as described.

4. The shell, the steam-supply pipe, the diaphragm in said shell, and perforations in said diaphragm, in combination with the valves working through said perforations, seating on opposite faces of the diaphragm, and one of them having a greater area exposed to the steam than the other, a lever-connection between the ends of said valves opposite those exposed to the pressure of the steam, the armature, and a lever-connection between said armature and the said lever and magnet for actuating the said armature, substantially as described.

5. The shell, the steam-supply pipe, the diaphragm in said shell, and perforations in said diaphragm, in combination with the valves working through said perforations, seating on opposite faces of the diaphragm, and one of them having a greater area exposed to the steam than the other, a lever-connection between the ends of said valves opposite those exposed to the pressure of the steam, the armature, a lever-connection between said armature and the said lever, the magnets for actuating said armature, the battery, line-wires between said battery and magnets, contact-points between said battery and one of the magnets, and a thermostat adapted and arranged to automatically make and break contact between said contact-points, substantially as described.

6. The shell, the magnet, and the armature operating the valves, in combination with means for rigidly maintaining the armature at either end of its stroke, substantially as and for the purpose described.

7. The shell, the steam supply pipe, the diaphragm in said shell, perforations in said diaphragm, valves working through said perforations, seating on the opposite faces of the diaphragm, and a lever-connection between the ends of said valves, in combination with the armature, a lever-connection between said armature and the valve-lever, a magnet for actuating said armature, and means for maintaining the armature rigidly in or out of contact with the magnet, substantially as described.

8. The shell, the steam-supply pipe, the diaphragm in said shell, perforations in said diaphragm, valves working through said perforations, seating on the opposite faces of the diaphragm, and a lever-connection between the ends of said valves, in combination with the armature, a lever-connection between said armature and the valve-lever, a magnet for actuating said armature, a stuffing-box screwed through the shell, a sleeve screwing into said stuffing-box and operated by an external hand-wheel, and a pin-and-gooove connection between the said sleeve and armature, substantially as described.

ABRAHAM S. KISSELL.

Witnesses:
W. W. ELLIOTT,
WILL R. OMOHUNDRO.